April 25, 1961     A. Y. DODGE     2,981,125
TRANSMISSION
Filed Dec. 22, 1958     2 Sheets-Sheet 1
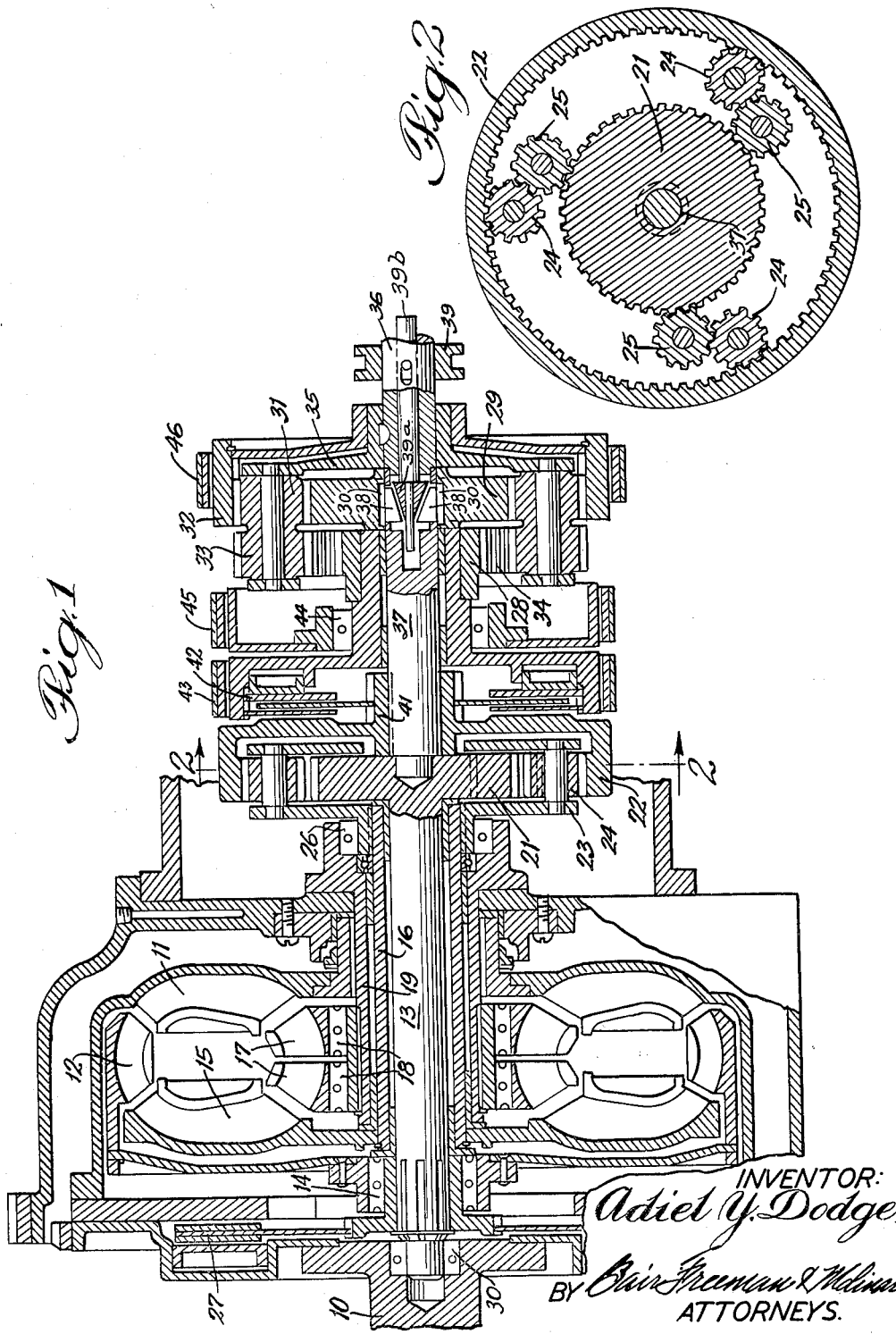
INVENTOR:
Adiel Y. Dodge,
BY Blair, Freeman & Molinare
ATTORNEYS.

April 25, 1961   A. Y. DODGE   2,981,125
TRANSMISSION
Filed Dec. 22, 1958   2 Sheets-Sheet 2

INVENTOR:
Adiel Y. Dodge,
BY
ATTORNEYS.

United States Patent Office 2,981,125
Patented Apr. 25, 1961

2,981,125
TRANSMISSION
Adiel Y. Dodge, % A. Y. Dodge Co., 206 S. Main St., Rockford, Ill.
Filed Dec. 22, 1958, Ser. No. 781,967
6 Claims. (Cl. 74—688)

This invention relates to transmissions and more particularly to multiple range fluid drive transmissions of the type suitable for use on automotive vehicles.

The efficiency of fluid drive transmissions and particularly of torque converter transmissions can be improved by providing a number of different operating ranges or ratios behind the torque converter. In this way, the torque converter may operate in its optimum range a greater percentage of the time. It is desirable, however, that shifts from one range to another be made with no interruption of power and without shock.

It is one of the object of the present invention provide a transmission which is simple in construction, has a minimum number of operating parts, and is easily controllable to provide a number of different ranges without torque interruption or shock.

Another object is to provide a transmission in which there are a plurality of reaction members forming fulcrums for torque multiplication and shifting is accomplished by picking up the load from the reaction members successively with no interruption of power.

According to a feature of the invention, the transmission includes two differential gear sets, the first of which has two input members connected to variable driving means, such as separate rotors of a torque converter, and with an output member connectible selectively or simultaneously to two input members of the second gear set, there being a one-way brake to hold one input element of the second gear set so that it may act as a fulcrum for torque multiplication. The second gear set preferably also includes a ring gear which may be held by a brake for reverse drive.

A further object is to provide a transmission which includes a retarding brake on an input element of the second gear set so that the output shaft will drive one of the torque converter rotors and/or the engine at increased speed for braking the vehicle.

A still further object is to provide a transmission in which one of the shifts is effected automatically through an impulse torque multiplying unit.

The above and other objects and features of the invention will be more readily apparent from the following description when read in connection with the accompanying drawings, in which:

Figure 1 is an axial sectional view of a transmission embodying the invention;

Figure 2 is a partial section of the first gear set on the line 2—2 of Figure 1;

Figure 3:
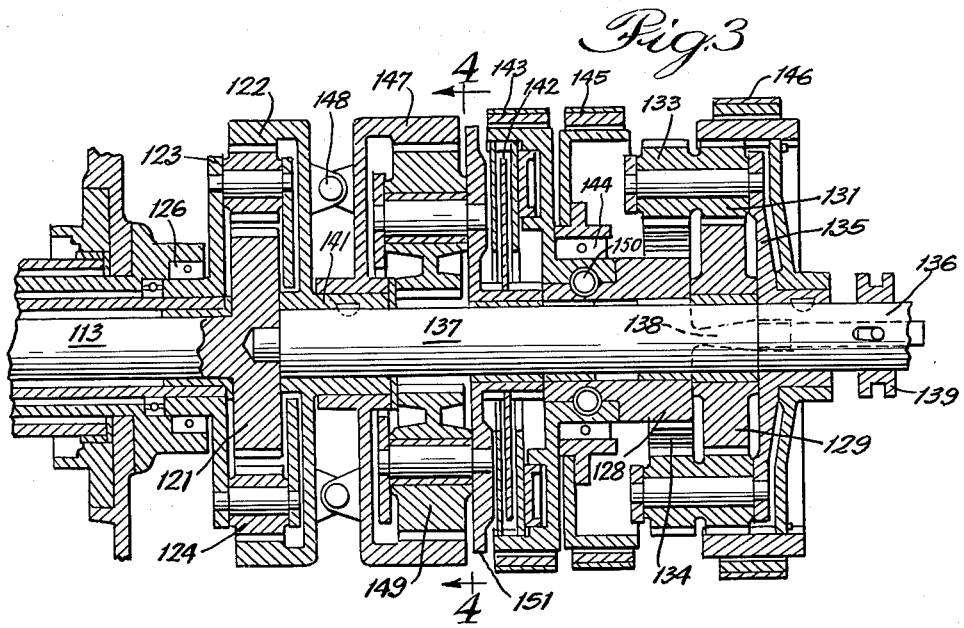
Figure 3 is a partial view similar to Figure 1 showing an alternative construction.

The transmission of Figure 1 includes a hydraulic torque converter having a driving impeller and two driven rotors and as shown is constructed in the manner more particularly described and claimed in my co-pending application Serial No. 487,911, filed February 14, 1955 and now Patent No. 2,892,363. As shown, the transmission has a driving shaft 10 to which a vaned driving impeller 11 of the torque converter is connected. A first rotor 12 positioned at the radially outer end of the impeller 11 receives liquid from the impeller and is connected to an intermediate shaft 13 through a one-way clutch 14 to drive the shaft in a forward direction. A second vaned rotor 15 receives fluid from the first rotor 12 and is connected to a driving sleeve 16 around the shaft 13. The torque converter is completed by one or more vaned stator elements 17 which are held against reverse rotation by one way brakes 18 acting between the stator elements and a fixed sleeve 19.

The torque converter elements are connected to two input elements of a first differential gear set which, as shown, includes a sun gear 21 secured to the intermediate shaft 13, a ring gear 22 which constitutes the output element of the gear set and a planet carrier 23 connected to the sleeve 16. The planet carrier carries a plurality of planet pinions 24 meshing with the ring gear 22 and meshing through idlers 25, as shown in Figure 2, with the sun gear 21. The planet carrier and driving sleeve 16 are preferably held against reverse rotation by a one way brake 26 so that the planet carrier may function as a fulcrum for torque multiplication. If desired, a clutch 27, shown as a friction clutch, may connect the shaft 13 directly to the driving shaft 10 for combined mechanical and hydraulic two-path drive.

The ring gear 22 drives one or more input members of a second differential gear set which, as shown, comprises two sun gears 28 and 29. The sun gear 29 meshes with planet pinions 31 which in turn mesh directly with a ring gear 32. The planet pinions 31 have integral extensions 33 which mesh with idler pinions 34 which in turn mesh with the sun gear 28. The several planet pinions are carried by a rotatable carrier 35 which is secured to the driven shaft 36.

For driving the second gear set, the sun gear 29 may be connected to an intermediate shaft 37 through a positive toothed clutch, including sliding keys 38 slidable radially through openings in the shaft 37 into and out of recesses 30 in the hub or gear 29. The keys 38 may be shifted by a cone 39a carried on a rod 39b which is slidable in a bore in shaft 36 and controlled by a shift collar 39. The intermediate shaft 37 is keyed to a hub 41 on the ring gear 22. The ring gear 22 may also be connected to the sun gear 28 through a friction clutch 42 which is engageable at will, or through suitable automatic controls as desired. A brake 43 may hold the sun gear 28 against rotation in either direction when desired and is effective for engine braking of the vehicle when descending steep grades or the like, as described hereinafter. Additionally, the sun gear 28 may be held against reverse direction by a one way brake 44 and a mechanically operable brake 45 which are connected in series.

With the construction as so far described, for starting under relatively low speed and high torque conditions, the brake 45 is engaged, brake 43 is disengaged and clutch 42 is disengaged. At this time, the first rotor 12 will tend to be driven forward and will tend to drive the sun gear 21 forward with the carrier 23 being held against reverse rotation by the one way brake 26. Forward rotation of the sun gear 21 will turn the ring gear 22 forward and it in turn will drive the sun gear 29 forward. With the sun gear 28 being held against reverse rotation by the one way brake 44 and mechanical brake 45, the planet carrier 35 and the driven shaft will be turned forward at low speed and high torque. It will be noted that at this time there are three reaction members present in the system, namely the one way brakes 18 for the stators 17, the one way brake 26 for the carrier 23 of the first gear set and the one way brake 44 for the sun gear 28. As the speed increases and the torque decreases fluid acting on the second rotor 15 will pick it up and drive it forward. Under these conditions both the sun gear 21 and the carrier 23 are turning forward to drive the ring gear 22 forward at varying torque ratios and at a speed approaching the speed of the driving shaft. During this operation, the torque reaction of the ring gear 22 is divided between the rotors 12 and 15 in a differential manner so that maximum hydraulic efficiency of the torque converter is obtained. In this ratio two reaction members are still present namely the one way brakes 18 for the stators 17 and the one way brake 44.

As the speed increases still further and the torque load decreases further, the stators 17 will start overrunning, as is known in the art, so that the torque converter functions in the manner of a fluid coupling to achieve a unitary torque ratio and tending to drive both the sun gear 21 and carrier 23 forwardly at a speed approaching the drive shaft speed. Under these conditions only the single reaction member 44 is functioning to provide a still higher ratio.

For maximum speed and minimum torque conditions the clutch 42 may be engaged to connect the sun gear 28 to the ring gear 22. At this time both sun gears 28 and 29 are connected to the ring gear 22 and the transmission tends to operate at a one to one torque and speed ratio. It will be apparent that the clutch 42 could be engaged prior to the time the stators 17 start overrunning to maintain the torque converter in a torque multiplying range of operation until higher speed and lower torque conditions are attained.

To accomplish a combined mechanical and hydraulic two path drive when desired for maximum efficiency, the clutch 27 may be engaged to connect the sun gear 21 directly and mechanically to the drive shaft. At this time, the rotor 12 may, under some conditions, turn slower than the shaft 13 due to the one way clutch 14. In any event, with the clutch 27 engaged the sun gear 21 will be driven mechanically at a one to one ratio from the driving shaft and the carrier 23 will be driven hydraulically through the torque converter to provide a combined hydraulic and mechanical two path drive.

For reverse the clutch 38 is disengaged to free the sun gear 29 from the intermediate shaft 37 and the ring gear 32 is held against rotation by a brake 46. The clutch 42 is engaged so that the ring gear 22 will drive the sun gear 28 and it will in turn through the planet pinions 24 and 25 and the ring gear 32 cause the planet carrier 35 and the driven shaft to turn in a reverse direction at reduced speed and increased torque.

For descending hills with the benefits of engine braking the brake 43 may be engaged with the clutch 42 disengaged and brake 45 disengaged. As the driven shaft 36 tends to turn faster than the drive shaft 10, the sun gear 28 will function as a reaction member and the second gear set will turn the sun gear 29 and the ring gear 22 forward at multiplied speed. The carrier 23 of the first gear set will tend to turn the vaned rotor 15 forward at multiplied speed and will hydraulically resist overrunning of the driven shaft 36 and the sun gear 21 may be connected to the drive shaft through a one way clutch 30 to provide an engine braking effect.

While various torque and speed ratios may be achieved with the transmission as shown, it is to be noted that several different ranges or operating ratios are provided through the gear set and the design is preferably such that relatively small differences exist between the different ranges. In this way, shifting from one range to the next either up or down can be accomplished easily without shock to maintain optimum efficiency conditions. In a desirable design, the hydraulic torque converter may provide an infinitely variable range from one to one up to two to one to drive the sun gear 21. The first gear set, when the carrier 23 is held against reverse rotation, may provide a torque increase of 1.5 to 1. The second gear set, when the sun gear 28 is held against rotation, may provide a torque multiplication of 1.4 to 1. With this type of transmission, it is possible to use a high speed rear axle on the order of 3.1 to 1 which will give an extremely economical cruising speed. The change in ratio of the first gear set occurs entirely automatically when the torque exerted by the second vane rotor 15 becomes sufficient to overcome the reaction torque carrier 23 so that this change will under all conditions occur smoothly and with no shock in either direction. Engagement of the clutch 42 merely picks up the sun gear 28 and is required only to overcome the reaction torque on this sun gear, which is relatively small, so that the shift in the up direction can be made smooth and without shock. In the down-shifting direction, when the clutch 42 is disengaged the sun gear 28 will simply be picked up by the one way brake 44 to prevent reverse rotation and this shift will also occur without shock. With the present transmission it is therefore possible to provide a number of different ratios or ranges to maintain optimum operating efficiency and to change from one ratio to the other without shock.

Figure 4:
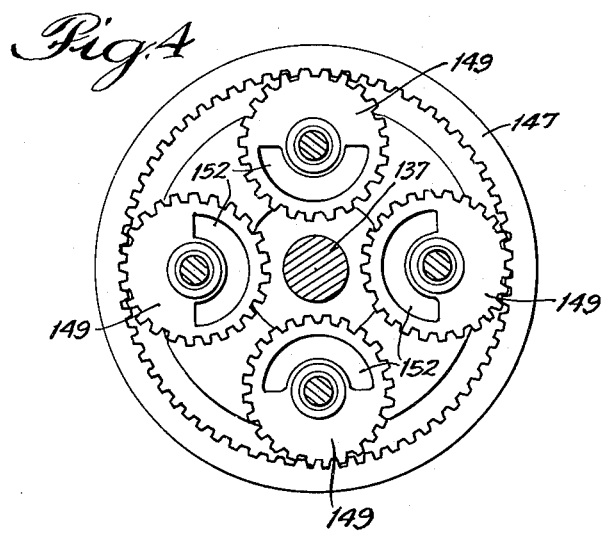
Figure 4 is a partial section on the line 4—4 of Figure 3.

Figures 3 and 4 illustrate a modification in which the shift to drive the sun gear 28 occurs automatically and parts in this construction corresponding to like parts in Figures 1 and 2 are designated by the same reference numerals, plus 100. In this construction the ring gear 122 is connected to a second ring gear 147 through couplings 148 which are resilient in torsion to absorb negative impulses. The ring gear 147 meshes with counterweighted planet pinions 149 which are rotatably mounted on a carrier 151. The carrier 151 may be connected through the clutch 142 and a spring 150 to the sun gear 128.

As best seen in Figure 4, each of the pinions 149 is cut out at one side, as shown at 152, so that they are eccentrically weighted and the pinions are so oriented that the weighted portions of all the pinions will be urged outward at the same time, as illustrated in Figure 4. When the clutch 142 is engaged the sun gear 128 will not necessarily be driven forward unless the centrifugal effect of the pinions 149 is sufficient to develop a torque greater than the reaction torque on the sun gear 128. During this period, when the sun gear 128 is not turning forward, the ring gear 147 will turn the pinions about their own axes and due to the unbalance thereof the pinions will generate impulses tending to turn the sun gear 128 forward. The strength of these impulses will vary with the speed of the ring gear 147 so that when a sufficiently high speed is reached the planet carrier 151 and the sun gear 128 will start to turn forward.

Negative impulses tending to turn the ring gear 147 backward will be absorbed by the resilient couplings 148 and one way brake 144 and the energy transmitted to the couplings 148 will be returned to the ring gear during forward impulses. Positive impulses plus the energy stored in the resilient elements during negative impulses will be smoothly transmitted to the sun gear 128 through the spring 150 to drive the gear 128 at varying speeds and varying torque ratios from the ring gear 122. At high speed and low torque conditions, the pinions 149 will remain in the position shown in Figure 4 to transmit torque directly to the sun gear 128. The impulse effect of the pinions may be as more particularly described and claimed in my Patent Nos. 2,039,147 and 2,082,444 and aside from the automatic shift and the torque multiplication provided by the impulse effect of the pinions, the transmission of Figures 3 and 4 effects the same ratios in the same manner as the transmission of Figures 1 and 2.

While two embodiments of the invention have been shown and described herein, it will be understood that they are illustrative only and not to be taken as a definition of the scope of the invention, reference being had for this purpose to the appended claims.

What is claimed is:

1. A transmission for connecting a driving shaft to a driven shaft comprising a first gear set having two input members and an output member, variable speed and torque means operable from the driving shaft to drive the input members forward independently of each other, one way brake means to hold one of the input members against reverse rotation, a second differential gear set including two input elements and an output element, means connecting the output element to the driven shaft, means connecting one of the input elements to the output member, a one way brake means to hold the other input element against reverse rotation, and means to connect the output member drivably to said other input element including means automatically responsive to the speed of the output member and torque on said other input element.

2. A transmission for connecting a driving shaft to a driven shaft comprising a differential gear set having two input members and an output member, variable speed and torque means operable from the driving shaft tending to drive the input members forward independently of each other, one way brake means to hold one of the input members against reverse rotation, a second gear set including a pair of sun gears, a planet carrier, and pinions on the carrier meshing with the sun gears, means connecting the carrier to the driven shaft, means connecting one of the sun gears to the output member, means including a one way brake to hold the other sun gear against reverse rotation, and means to connect the output member to said other sun gear.

3. A transmission for connecting a driving shaft to a driven shaft comprising a differential gear set having two input members and an output member, variable speed and torque means operable from the driving shaft tending to drive the input members forward independently of each other, one way brake means to hold one of the input members against reverse rotation, a second gear set including a pair of sun gears, a planet carrier, and pinions on the carrier meshing directly with one of the sun gears and through idler pinions with the other sun gear, means connecting the carrier to the driven shaft, means connecting said one of the sun gears to the output member, a releasable brake and a one way brake in series connected to said other sun gear to hold it against reverse rotation, means to connect said other sun gear to the output member, a ring gear meshing with the pinions, and a brake to hold the ring gear against rotation, said means connecting said one of the sun gears to the output member being a releasable clutch.

4. The transmission of claim 2 in which the last named means includes means automatically responsive to speed of the output member and torque on said other sun gear.

5. The transmission of claim 2 in which the last named means includes a mass inertia impulse transmission to drive said other sun gear at varying speeds and torques automatically approaching the speed of the output member.

6. A transmission comprising a hydraulic torque converter having a vaned driving impeller, a pair of vaned driven rotors receiving liquid in sequence from the impeller, a vaned stator, and a one way brake to hold the stator against reverse rotation, a first differential gear set having two input members and an output member, means connecting the input members to the rotors respectively, means to hold the input member connected to the second rotor in the series against reverse rotation, a second differential gear set having two sun gears, a planet carrier, and pinions on the carrier meshing directly with one of the sun gears and through idlers with the other sun gear, means to connect the carrier to a load, means to connect one of the sun gears to the output member, one way brake means to hold the other sun gear against reverse rotation, and means responsive to the speed of the output member and the torque on said other sun gear to drivably connect said other sun gear to the output member.

References Cited in the file of this patent
UNITED STATES PATENTS

| | | |
|---|---|---|
| 2,582,487 | Kelbel | Jan. 15, 1952 |
| 2,795,153 | Russell | June 11, 1957 |
| 2,839,951 | Winther | June 24, 1958 |
| 2,851,906 | De Lorean | Sept. 16, 1958 |
| 2,877,665 | Karow | Mar. 17, 1959 |
| 2,881,642 | Dodge | Apr. 14, 1959 |